(No Model.)

J. LETZKUS.
EXPANSION JOINT.

No. 327,281. Patented Sept. 29, 1885.

WITNESSES:
Darwin S. Wolcott
C. M. Clarke

INVENTOR.
John Letzkus.
BY George H. Christy
ATTORNEY.

UNITED STATES PATENT OFFICE.

JOHN LETZKUS, OF ALLEGHENY, ASSIGNOR TO HIMSELF AND CHARLES F. McKENNA, OF PITTSBURG, PENNSYLVANIA.

EXPANSION-JOINT.

SPECIFICATION forming part of Letters Patent No. 327,281, dated September 29, 1885.

Application filed March 5, 1885. (No model.)

*To all whom it may concern:*

Be it known that I, JOHN LETZKUS, a citizen of the United States, residing at Allegheny, in the county of Allegheny and State of Pennsylvania, have invented or discovered certain new and useful Improvements in Expansion-Joints, of which improvements the following is a specification.

Figure 1:
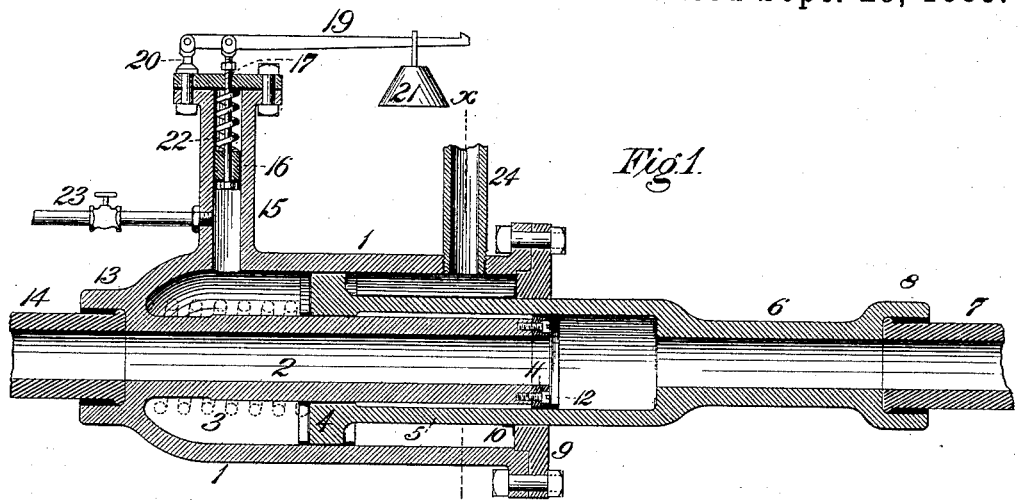
Figure 2:
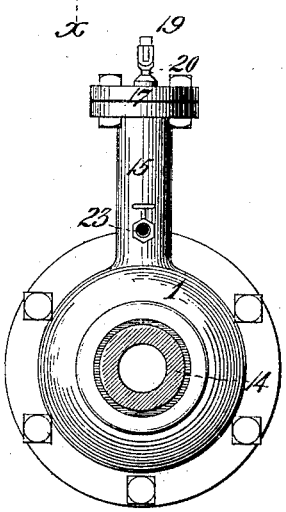
Figure 3:
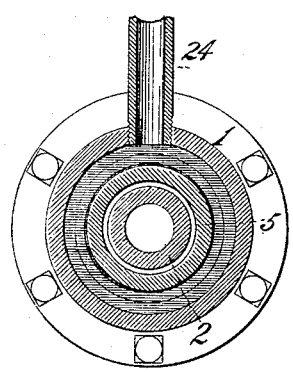

In the accompanying drawings, which make part of this specification, Figure 1 is a longitudinal sectional elevation of my improved expansion-joint. Fig. 2 is an end elevation. Fig. 3 is a transverse section on the line $x\ x$, Fig. 1.

My invention relates to that class of joints which are employed in connecting sections of pipe in laying a pipe-line, the purpose of such joint being to permit the contraction and expansion of the pipe-line under the influence of varying temperatures and pressures without destroying the integrity of the joints occuring in such pipe or the sections of pipe themselves.

The object of my invention is to so construct such a joint as to permit of freedom of movement of the pipe-line, and also to keep such line under a certain degree of longitudinal tension or pressure, the tendency of such pressure being to force the severed sections into more intimate contact or union; and to these ends my invention consists in the construction and combination of parts, all as more fully hereinafter described and claimed.

The main body or portion of my joint consists of a cylindrical shell, 1, inclosing a concentric tube, 2, said tube being made integral with the shell 1 at one end, as shown. Within the annular chamber 3 formed by the shell and tube is placed the annular piston 4, said piston being constructed to fit around the tube 2 and inside the shell 1, completely filling the annular chamber for a distance equal to the thickness of the piston. To the piston 4 is secured the pipe-like piston-rod 5, the internal diameter of said piston-rod being for a distance equal to the length of the piston-stroke equal to the external diameter of the tube 3, and being then contracted, as at 6, to a diameter approximately equal to the diameter of the pipes composing the pipe-line. The outer end of the piston-rod 5 is provided with any suitable means for connection with the adjacent end 7 of a section of the pipe-line—as, for instance, with an ordinary bell-mouth, 8—into which the end 7 of pipe-section is inserted and packed.

To the open end of the shell 1 is bolted the annular head 9, said head fitting closely around the piston-rod 5, and being provided with a packing, 10, forming a tight joint between the piston-rod and annular head. Within the piston-rod is placed another annular head, 11, which is secured by suitable bolts to the free end of the inclosed tube 2, and is provided with a packing-ring, 12, closing the joint between the head 11 and the internal wall of the tube 2.

At the opposite end of the shell, where the shell and tube are united, is formed a bell-mouth, 13, for the reception of the end 14 of the pipe-section; or in lieu of the bell-mouth the shell may be provided with any other suitable means for connection with the end 14 of the pipe-section.

On the shell 1, adjacent to its permanently-closed end, is formed a cylinder, 15, opening into the annular chamber 3, and provided with a piston, 16, the piston-rod 17 of said piston extending up through the head 18, securely bolted to the cylinder. To this piston-rod is pivoted the lever 19, fulcrumed to the stud 20, attached to the cylinder-head, and on the outer end of the lever is placed a weight, 21.

In lieu of the weighted lever, or in addition thereto, a spring, 22, may be interposed between the piston 16 and the cylinder-head.

After the above-described apparatus has been connected to the ends of two adjacent sections of a pipe-line—said ends being such a distance apart that the piston 4 will be at, or nearly at, the center of its stroke when the connection is completed—that portion of the annular chamber between the piston 4 and closed end of the shell and the cylinder 15 below the piston 16 is filled with water or some non-congealing fluid through the filling-pipe 23. Previous to pouring in the water the piston 16 is raised to the upper end of its cylinder, either by pulling up on the lever 19, or, where the spring 22 alone is used, a thread is formed on the piston-rod 17, then by turning down the nut 23, which, bearing against the cylinder-head, will raise the piston-rod and piston. After the cylinder and shell have been filled as above stated the nut 23 is turned up from the cylinder-head or the lever is lowered, thereby giving the desired pressure on the contained fluid and the piston 4, the amount of such pressure being regulated by the weight or the tension of the spring, which should by preference be about five hundred pounds.

By means of the above-described apparatus a constant pressure is exerted on the pipe-line at various points along its length, tending to keep the several sections in close contact and to compensate for any shortening of the line due to the contraction of its several sections. As the length of stroke of the piston 4 is considerable, these expansion-joints will not be necessary at more than every three or more joints; but the pressure on the fluid and piston should be increased in proportion to the number of sections interposed between any two expansion-joints, so as to insure an extension of pressure to every section and joint along the line.

In lieu of water-pressure, or in addition thereto, a spring of the desired tension may be interposed between the end of the annular chamber and the piston 4, the spring being preferable in cases where it is difficult to use a shell having a protruding cylinder.

In pipe-lines conveying gas I prefer to fill the annular chamber in the rear of the piston 4 with water or some non-congealing fluid, which will serve as a packing to prevent the escape of gas, and in order to keep such fluid under a pressure at least equal to the gas-pressure in the pipe-line, and also to provide means for the escape of the fluid when the piston is forced to the rear end of the annular chamber, a stand-pipe, 24, is attached to the shell near its rear end, as shown, said stand-pipe being of such a height as to contain the column of fluid necessary to produce the desired pressure.

It will be observed that in the above-described apparatus the piston-rod 5 and the inclosed tube 2 form continuations of the pipe-lines for the free passage of the gas.

In lieu of forming the shell and tube in one piece, the shell may be provided at its small end with a female thread, the end of the tube 2 being exteriorly threaded for insertion in the threaded part of the shell.

I claim herein as my invention—

1. In an expansion-joint, a shell having a passage therethrough for the conveyance of gas or other fluids, in combination with a piston fitting within said shell and provided with a hollow piston-rod, and a fluid-pressure column, substantially as described, for forcing said shell and piston in opposite directions, said shell and piston-rod being provided with suitable means for connection with adjacent ends of a pipe-line, as and for the purpose set forth.

2. In an expansion-joint, a shell having a concentric tube inclosed therein, in combination with a piston located in said shell and fitting around the tube, and having a hollow piston-rod and a fluid-pressure column, substantially as described, for forcing said shell and piston in opposite directions, said shell and piston being provided with suitable means for connection with the adjacent ends of a pipe-line, as and for the purpose set forth.

3. In an expansion-joint, a shell, in combination with a tube located in said shell, an annular piston and rod surrounding said tube, and a cylinder, a fluid-packing, and weighted piston connected to said shell, substantially as set forth.

4. In an expansion-joint, a shell, in combination with a tube located in said shell, an annular piston and rod, a cylinder connected to the shell at one end thereof, a fluid-packing, a weighted piston located in the cylinder, and a stand-pipe connected to the opposite end of the cylinder, substantially as set forth.

In testimony whereof I have hereunto set my hand.

JOHN LETZKUS.

Witnesses:
R. H. WHITTLESEY,
DARWIN S. WOLCOTT.